United States Patent [19]
Moss et al.

[11] Patent Number: 5,138,470
[45] Date of Patent: Aug. 11, 1992

[54] GUARD HOLOGRAMS

[75] Inventors: Gaylord E. Moss, Marina del Rey; John E. Wreede, Monrovia; Kevin Yu, Temple City; James E. Scott, Hermosa Beach, all of Calif.

[73] Assignee: Hughes Aircraft Company, Los Angeles, Calif.

[21] Appl. No.: 627,783

[22] Filed: Dec. 14, 1990

[51] Int. Cl.$^5$ .............................................. G02B 5/32
[52] U.S. Cl. ....................................... 359/13; 359/15; 359/16
[58] Field of Search ..................... 359/13, 15, 16, 22, 359/24

[56] References Cited

U.S. PATENT DOCUMENTS

| | | | |
|---|---|---|---|
| 4,966,426 | 10/1990 | Moss et al. | 359/15 |
| 4,973,132 | 11/1990 | McDonald et al. | 359/15 |
| 5,066,525 | 11/1991 | Nakamachi et al. | 359/15 |

Primary Examiner—Bruce Y. Arnold
Assistant Examiner—J. D. Ryan
Attorney, Agent, or Firm—Leonard A. Alkov; Wanda K. Denson-Low

[57] ABSTRACT

A head-up display for a vehicle, including a primary image reflection hologram supported by a transparent substrate located in the vehicle operator's field of view for the ambient scene in front of the vehicle, a light source for providing playback illumination to the primary image hologram, and a guard hologram in front of the primary image hologram for substantially reflecting ambient illumination that otherwise could spuriously turn on the first reflection hologram, the guard hologram having an angular bandwidth and a spectral bandwidth that are greater than the angular bandwidth and the spectral bandwidth of the primary image hologram, and having an optical density of 2.0 or greater. The guard hologram can be parallel fringe reflection hologram or a slant fringe reflection hologram.

7 Claims, 2 Drawing Sheets

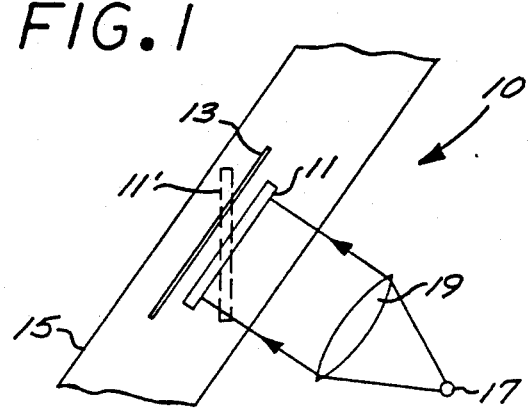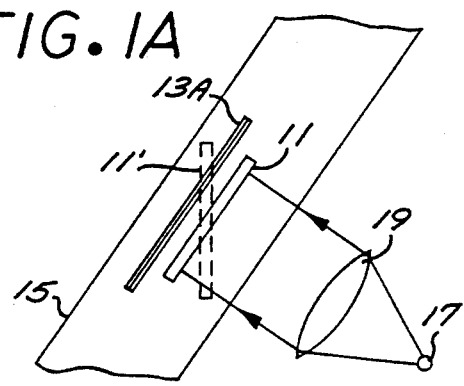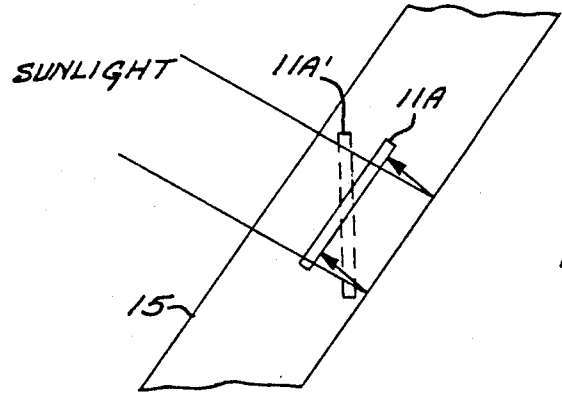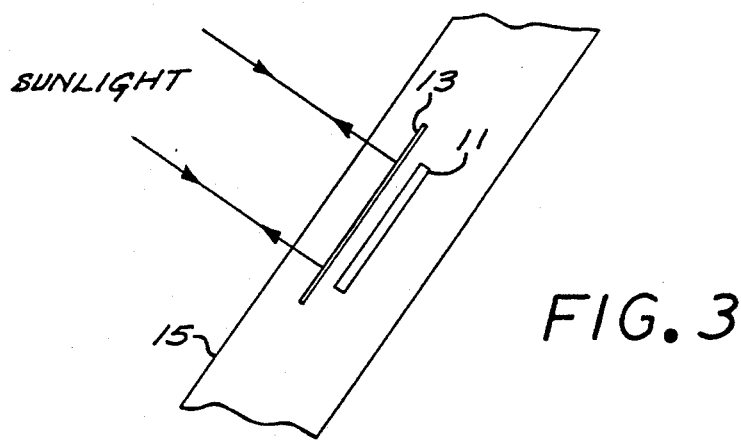

GUARD HOLOGRAMS

BACKGROUND OF THE INVENTION

The disclosed invention is generally directed to holographic head-up display for vehicles, and is directed more particularly to a holographic head-up display that includes a guard hologram for preventing spurious reconstruction of the primary image hologram of the display by ambient light.

Head-up vehicle instrument displays have been developed to provide instrumentation information within the line of sight of the operator of a vehicle such as an automobile. One approach to head-up display systems includes a reflection hologram laminated to the inside surface of a vehicle windshield or embedded between the layers of a vehicle windshield. The reflection hologram can include operating status information recorded therein, and is intended to be reconstructed or played back by an associated light source.

While the reflection hologram of a holographic head-up display will be designed to be responsive to a playback illumination having a narrow wavelength band over a narrow angular range, it is subject to other illumination such as sunlight, street lamps or road glare. Thus, spurious reconstruction is possible as a result of illumination other than the intended playback illumination. Such spurious reconstruction is unacceptable since the display may be used for warning status information, may generate unnecessary distractions, and moreover may lead to disregard of the display.

SUMMARY OF THE INVENTION

It would therefore be an advantage to provide a head-up holographic instrument display for a vehicle which has reduced susceptibility to spurious reconstruction from ambient illumination and which does not substantially reduce the see-through characteristic of the hologram of the display.

The foregoing and other advantages are provided in a head-up display that includes a primary image reflection hologram supported by a transparent substrate located in the operator's field of view for the ambient scene in front of the vehicle, a light source for providing playback illumination to the primary image hologram, and a guard hologram in front of the primary image hologram for substantially diffracting ambient illumination that otherwise could spuriously turn on the first reflection hologram, the guard hologram having an angular bandwidth and a spectral bandwidth that are greater than the angular bandwidth and the spectral bandwidth of the primary image hologram, typically with an optical density of 2.0 or greater. The guard hologram can be parallel fringe reflection hologram or a slant fringe reflection hologram.

BRIEF DESCRIPTION OF THE DRAWINGS

The advantages and features of the disclosed invention will readily be appreciated by persons skilled in the art from the following detailed description when read in conjunction with the drawing wherein:

FIG. 1 is a schematic illustration of a head-up display in accordance with the invention.

FIG. 1A is a schematic illustration of a head-up display in accordance with the invention which includes a multiple layer guard hologram.

FIG. 2 is a schematic illustration of a head-up display that is helpful in understanding the operation of the head-up displays of FIGS. 1 and 1A.

FIG. 3 is a further illustration of the head-up display of FIG. 1 depicting its operation as implemented with a guard hologram comprising a parallel fringe reflection hologram.

DETAILED DESCRIPTION OF THE DISCLOSURE

Figure 4:
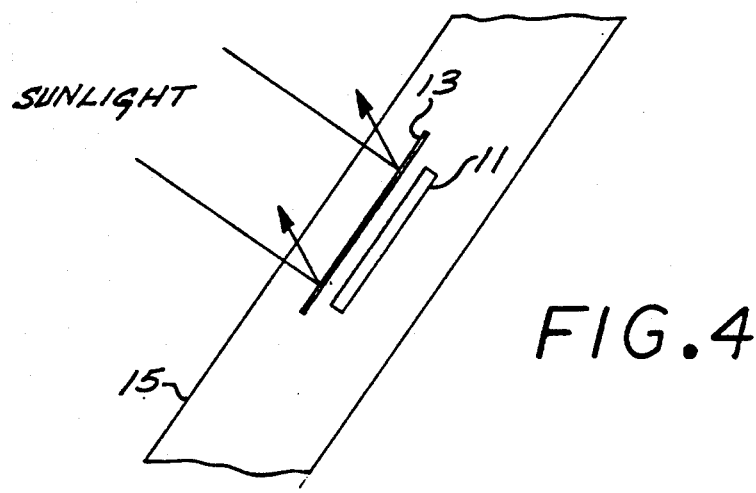
FIG. 4 is a further illustration of the head-up display of FIG. 1 depicting its operation as implemented with a guard hologram comprising a slant fringe reflection hologram.

In the following detailed description and in the several figures of the drawing, like elements are identified with like reference numerals.

FIG. 1 schematically depicts a head up display system 10 for a vehicle which includes a primary image hologram 11 and a guard hologram 13 that are supported between the layers of a standard vehicle safety windshield 15, with guard hologram 13 being in front of the primary image hologram which is therefore closest to the inside surface of the windshield. In other words, light from outside the vehicle has to pass through the guard hologram 13 in order to reach the primary image hologram. For efficiency and bandwidth considerations, the guard hologram can comprise a plurality of hologram layers 13A as schematically depicted in FIG. 1A.

A selectively energized light bulb 17 and a collimating lens 19 is one means to provide playback illumination for the primary image hologram 11, whereby a reconstructed image 11' viewable by the vehicle operator is produced by the primary image hologram in response to the playback illumination. A light bulb and a parabolic reflector are another means for providing collimated playback illumination. Many other primary illumination sources could be used, including for example light emitting diodes, laser diodes, or fiber optic coupling to a remote source.

By way of example, the primary image hologram 11 is recorded to produce an image comprising an indication of a predetermined status of a monitored operating characteristic and the light bulb 17 is energized when a sensor detects the status appropriate for display of the indication stored in the primary image hologram. By way of illustrative example, the indication stored in the primary image hologram can be words LOW FUEL which would reconstructed when the vehicle fuel sensor detects the fuel level as being below a predetermined level.

While the reconstructed image 11' is shown at a particular position for illustrative purposes, it should be appreciated that it can be positioned at different locations and different angles as determined in the hologram recording process. It should also be appreciated that primary image hologram 11 and the guard hologram 13 laminate can be secured alternatively to inside surface of the windshield 15, or a separate free-standing transparent panel.

The guard hologram 13 is configured to reflect or diffract ambient illumination having a spectral content and incidence angle that in the absence of the guard hologram 13 would cause spurious reconstruction that would be viewable within the driver's eyebox which is the region in space in which the driver's eyes are reasonably expected to be. Such spurious reconstruction would be the result of ambient illumination passing from the outside through the holograms and reflecting at a reflecting surface so as to be incident on primary image hologram 11 at angle and with the spectral content to cause reconstruction. In other words, the guard hologram is configured to reflect or diffract ambient illumination which if not so reflected or diffracted by the guard hologram would cause spurious reconstruction of the primary hologram image that would be viewable within the driver's eyebox.

The function of the guard hologram 13 can be further appreciated by reference to FIG. 2 which depicts a display system similar to that of FIG. 1 but without a guard hologram and illustrates the mechanism by which spurious reconstruction can occur without a guard hologram in accordance with the invention. If beam of broadband ambient light that includes the narrow wavelength range required to reconstruct the hologram image is incident on the image hologram 11A within the angular range appropriate for reflection at the inside windshield/air interface to provide reflected illumination to the image hologram within the incidence angular range appropriate for reconstruction that is viewable within the driver's eyebox, an unwanted reconstruction 11A' of the hologram image would occur. The unwanted reconstruction would provide incorrect information to the vehicle operator, constitute an annoyance, and moreover would produce a lack of confidence in the status indicator which eventually would be ignored.

With an appropriate guard hologram 13 in accordance with the invention, ambient light that would otherwise cause undesired reconstruction is reflected or diffracted, as shown in FIGS. 3 and 4. In FIGS. 3 and 4, ambient light beams are incident on the guard holograms at an angle that would cause spurious reconstruction of the primary image hologram. The display of FIG. 3 includes a parallel fringe guard hologram and the ambient light beam is diffracted at an angle that is equal to the incidence angle. The display of FIG. 4 includes a slant fringe guard hologram, and the ambient light is diffracted at an angle different from the incidence angle.

It is noted that a guard hologram with slant fringes can potentially be a noise problem as a result of the phenomenon known as slant fringe flare (or fringe break out flare), by which reflective holographic optical elements can create a rainbow diffraction pattern. The pattern is a function of slant angle and fringe spacing, and while there are various techniques for reducing slant fringe flare, it cannot be completely eliminated.

It should be appreciated that if the image hologram were secured to the inside surface of the windshield, the reflecting surface of concern for producing spurious turn on would be the hologram/air interface inside the vehicle.

The guard hologram 13 is generally a reflection hologram which acts as a narrow-band diffraction mirror at some combination of incident angle and wavelength of ambient light. Under certain conditions, the guard hologram can be of the parallel fringe type (wherein the holographic fringes are parallel to the substrate surface) which diffract the light beam in the same directions that they would be reflected to by a standard mirror. Under other conditions, the desired hologram might be of the slant fringe type (wherein the holographic fringes are tilted with respect to the substrate). A slant fringe guard hologram would not follow the law of reflection (i.e., the angle of reflection would not equal the angle of incidence). In either case, there is no recognizable image at or near the windshield as a result of illumination from within the vehicle. If there is a stray reflection as a result of illumination from within the vehicle, it is as if there were a colored mirror at the windshield.

It is noted however that a guard hologram with parallel fringes could cause a slight problem. A portion of the playback beam which reconstructs the desired image might pass through the primary image hologram and be reflected back by the guard hologram to reconstruct a ghost image. In most cases, this ghost would not be a problem. In fact this ghost has not been observed even though it is probably present. If the ghost were a problem, the solution is to use a guard hologram which reflects the light back at a new angle which will not reconstruct the hologram. Slanted holographic fringes of 5 degrees or more will reflect back at an angle sufficient to not reconstruct a ghost image.

The functional characteristics of the guard hologram are more particularly defined in reference to the primary image hologram. The primary image hologram 11 is recorded to reconstruct at one particular angle and one particular wavelength. However, as is the nature with holograms, a different angle of incidence can give an aberrated image at some other viewing angle for some other wavelength. Since the playback source in the vehicle is configured to provide playback illumination at or close to the designed reconstruction angle, there is no problem with false images of other colors as a result of the playback illumination source. Sunlight, however, can produce the correct colored image as well as different colored images at different solar angles that would be viewable within the driver's eyebox. The guard hologram 13 must therefore guard against both of these possibilities.

Although the primary image hologram will reconstruct at many different angles and many different wavelengths, the guard hologram needs to be effective only for those combinations of wavelengths and angles of ambient light that would cause reconstruction that is viewable from within the vehicle operator's eyebox. For a typical automotive application eyebox having an angular size of about ±6 degrees and positioned at about 72 degrees up from the normal to the hologram, a reconstruction image will not be viewable from within the eyebox if produced by light that is outside ±8 degrees relative to the construction angle and/or has a wavelength that is outside the band that includes 10 nm on each side of one-half the 50% bandwidth.

Generally, the guard hologram is constructed for a peak wavelength that is the same as the peak wavelength of the primary image hologram and a reconstruction angle that is defined by the ambient illumination incidence angle necessary to produce a reflected beam that is parallel to the primary image hologram reconstruction angle. Further, the guard hologram has an angular bandwidth and a spectral bandwidth larger than those of the primary image hologram 11. The considerations in constructing the guard hologram more particularly include the following:

(a) The reconstruction angle and peak wavelength of the primary image hologram.
(b) The size of the eyebox.
(c) The angular range of playback illumination which produces a reconstructed image that is viewable from within the eyebox. This depends not only on the size of the eyebox, but also on the bandwidth of the primary image hologram. For the typical automotive application eyebox discussed above (angular size of about ±6 degrees and positioned at about 72 degrees above the normal to the image hologram) and for a typical image hologram bandwidth of about 20 to 25 nm, protection would be needed for an additional 6 degrees beyond the eyebox and a spectral band that is greater than the primary image hologram bandwidth by about 10 nm.
(d) The amount of desired reduction in intensity of spurious reconstruction images.
(e) The available index modulation in the guard hologram recording material (if lower than 0.04, for example) may require that the guard hologram comprise multiple hologram layers, each with a narrower angular and spectral bandwidths and together providing composite spectral and angular bandwidths having the desired values.

By way of illustrative example, the guard hologram is constructed to have (i) a peak efficiency of at least 99% at its designed reconstruction angle and peak wavelength, and (ii) an efficiency of at least 50% at all angles and wavelengths for which the primary image hologram spurious reconstruction brightness viewable from within the eyebox would be 10% of the peak spurious reconstruction brightness (which would be produced in the absence of the guard hologram by ambient illumination that causes reflected illumination that is aligned with the primary image hologram reconstruction angle). The peak efficiency of at least 99% is achieved with an optical density of 2.0 or greater.

While the guard hologram in accordance with the invention significantly reduces spurious reconstruction, it provides minimal attenuation and color distortion of incoming light. In particular, while a guard hologram having a 50 nm bandwidth and a reconstruction angle that is normal to the hologram would attenuate 25% of incoming light that is normal thereto, the ambient scene illumination ahead of the driver is incident thereon at large angles relative to normal. At such large angles, the guard hologram diffracts substantially only light that has shorter wavelengths than visible light and therefore the ambient scene illumination passes through substantially unattenuated and substantially without color distortion. Thus, even a guard hologram that is deep red when viewed at normal to the windshield would not substantially attenuate or color distort the ambient scene as viewed from within the range of normal driver positions.

Figure 5:
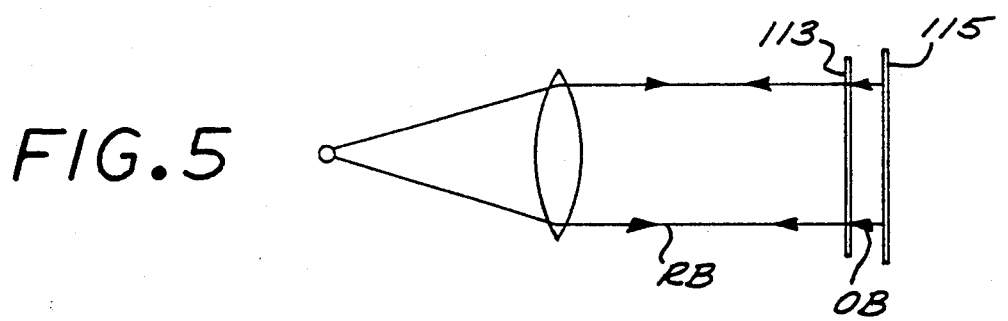
FIG. 5 is a schematic diagram depicting a configuration for recording a parallel fringe guard hologram for use in the displays of FIGS. 1 and 1A.

FIG. 5 schematically depicts a recording setup for recording a parallel fringe guard hologram or one of the layers of a multiple layer guard hologram. A hologram recording film is exposed to a collimated reference beam RB that is normal thereto and an object beam OB that is provided by a portion of the reference beam RB that passes through the recording film and is reflected by a mirror 113 that is parallel to the recording film 111. It should be appreciated that for a multiple layer guard hologram, each layer would be constructed at a slightly different angle or wavelength.

Figure 6:
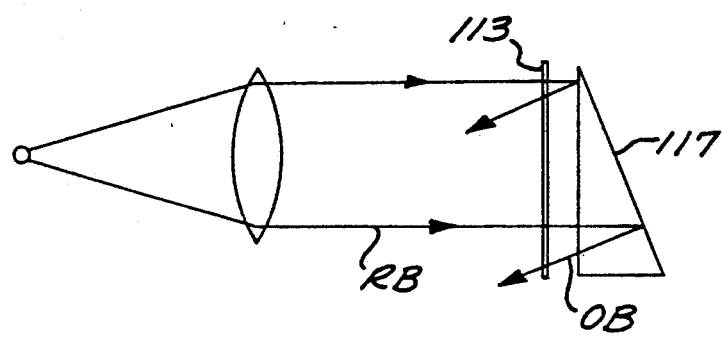
FIG. 6 is a schematic diagram depicting a configuration for recording a slant fringe guard hologram for use in the displays of FIGS. 1 and 1A.

FIG. 6 schematically depicts a recording setup for recording a slant fringe guard hologram or one of the layers of a multiple layer guard hologram. A hologram recording film 111 is exposed to a collimated reference beam RB that is normal thereto and an object beam OB that is provided by a portion of the reference beam RB that passes through the recording film and is reflected by a prism surface 213 that is not parallel to the recording film 111. Alternatively, the object beam can be produced by using a mirror that is not parallel to the recording film 111. It should be appreciated that for a multiple layer guard hologram, each layer would be constructed at a slightly different angle or wavelength.

The foregoing has been a disclosure of a head-up display for a vehicle that has reduced susceptibility to spurious image reconstruction from ambient illumination and which does not substantially reduce the see-through characteristics of the holographic elements of the display.

Although the foregoing has been a description and illustration of specific embodiments of the invention, various modifications and changes thereto can be made by persons skilled in the art without departing from the scope and spirit of the invention as defined by the following claims.

What is claimed is:

1. A head-up display for a vehicle, comprising:
a primary image hologram supported in the vehicle operator's field of view of the ambient scene in the front of the vehicle; and
a guard hologram in front of the primary image hologram for diffracting ambient illumination that otherwise could spuriously turn on the first reflection hologram, the guard hologram having an angular bandwidth and a spectral bandwidth that are greater than the angular bandwidth and the spectral bandwidth of the primary image hologram.

2. The head-up display of claim 1 wherein said guard hologram provides 99% efficiency at its reconstruction angle, and provides at least 50% efficiency at angles and wavelengths for which the primary image hologram spurious reconstruction brightness is about 10% of its peak spurious reconstruction brightness, where such spurious reconstruction would be the result of ambient illumination in the absence of said guard hologram.

3. The head-up display of claim 2 wherein said guard hologram comprises a parallel fringe reflection hologram.

4. The head-up display of claim 3 wherein said guard parallel fringe reflection hologram has an optical density of 2.0 or greater.

5. The head-up display of claim 2 wherein said guard hologram comprises a slant fringe reflection hologram.

6. The head-up display of claim 5 wherein said guard slant fringe reflection hologram has an optical density of 2.0 or greater.

7. The head-up display of claim 2 wherein said guard hologram comprises multiple hologram layers which together provide said angular bandwidth and spectral bandwidth of said guard hologram.

* * * * *